(12) United States Patent
Kawamura

(10) Patent No.: US 10,404,879 B2
(45) Date of Patent: Sep. 3, 2019

(54) REMOTE SUPPORT SYSTEM THAT NOTIFIES WHEN A DEVICE IS IN A STATE OF REMOTE SUPPORT SERVICE, IMAGE FORMING APPARATUS, EXTERNAL TERMINAL, PRINTER CONTROLLER, METHODS OF CONTROLLING THESE, AND STORAGE MEDIUM

(71) Applicant: CANON KABUSHIKI KAISHA, Tokyo (JP)

(72) Inventor: Nobuhiro Kawamura, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/405,502

(22) Filed: Jan. 13, 2017

(65) Prior Publication Data

US 2017/0208199 A1    Jul. 20, 2017

(30) Foreign Application Priority Data

Jan. 19, 2016 (JP) .................... 2016-008287

(51) Int. Cl.
*G06F 3/12* (2006.01)
*H04N 1/00* (2006.01)

(52) U.S. Cl.
CPC ..... *H04N 1/00925* (2013.01); *H04N 1/00039* (2013.01); *H04N 1/00074* (2013.01); *H04N 1/00204* (2013.01); *H04N 1/00344* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 2009/0237725 A1* | 9/2009 | Hamaguchi | ........ | H04N 1/00222 358/1.15 |
| 2013/0070260 A1* | 3/2013 | Tokushima | .............. | H04N 1/54 358/1.2 |
| 2014/0268226 A1* | 9/2014 | Yoshida | .............. | G06F 11/0733 358/1.15 |
| 2015/0181056 A1* | 6/2015 | Mutsuno | ............ | H04N 1/00344 358/1.14 |
| 2015/0301765 A1* | 10/2015 | Nishiyama | ............ | G06F 3/1203 358/1.15 |
| 2016/0286076 A1* | 9/2016 | Kuribara | ............ | H04N 1/32771 |

FOREIGN PATENT DOCUMENTS

JP    2005-208974 A    8/2005

* cited by examiner

*Primary Examiner* — Henok Shiferaw
(74) *Attorney, Agent, or Firm* — Venable LLP

(57) ABSTRACT

The present invention provides a mechanism by which an image forming apparatus notifies an apparatus that inputs an image forming job to the image forming apparatus that the image forming apparatus is during remote support service, and suitably restricts acceptance of image forming jobs.

17 Claims, 11 Drawing Sheets

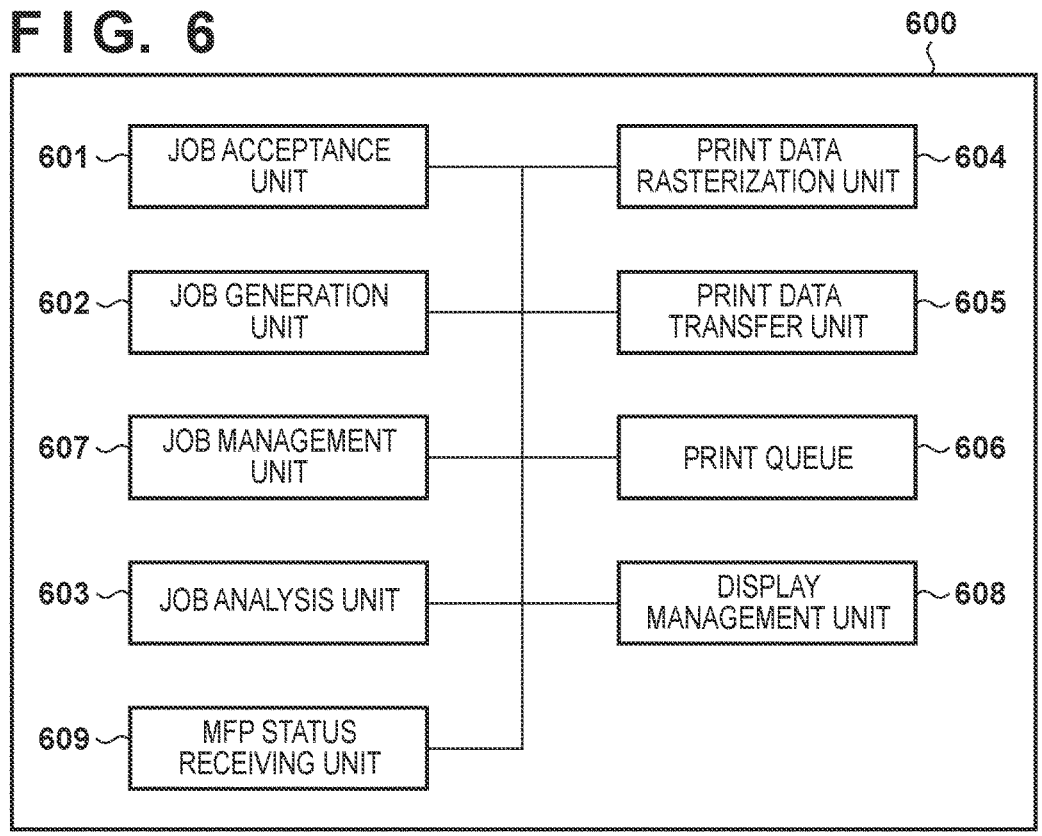
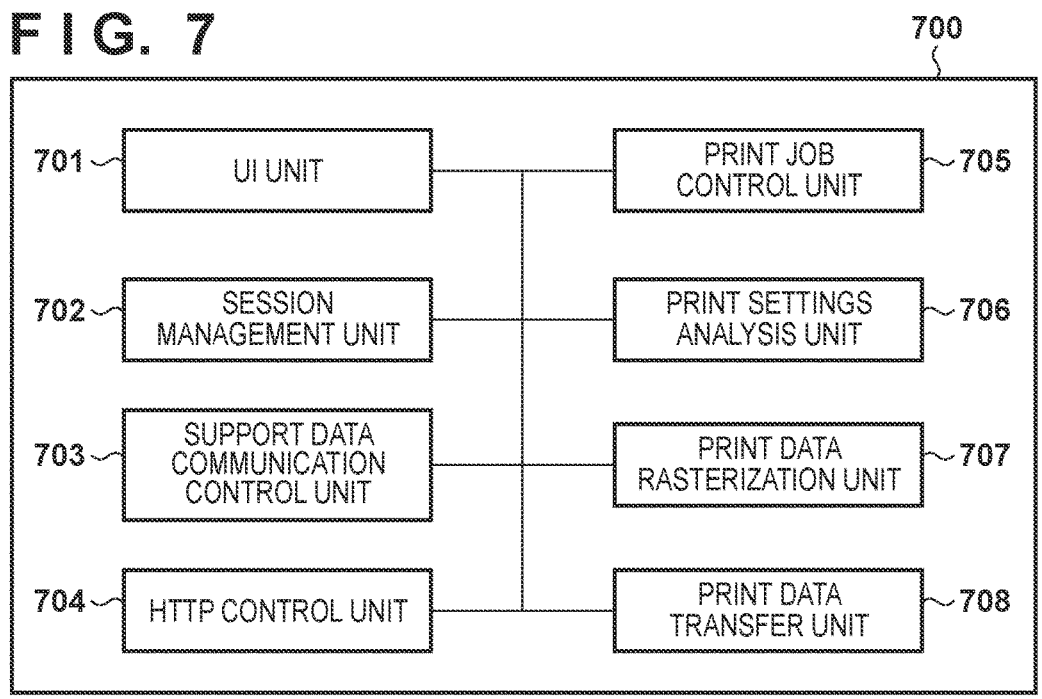

REMOTE SUPPORT SYSTEM THAT NOTIFIES WHEN A DEVICE IS IN A STATE OF REMOTE SUPPORT SERVICE, IMAGE FORMING APPARATUS, EXTERNAL TERMINAL, PRINTER CONTROLLER, METHODS OF CONTROLLING THESE, AND STORAGE MEDIUM

BACKGROUND OF THE INVENTION

Field of the Invention

The present invention relates to a remote support system having a remote support service, an image forming apparatus, an external terminal, a printer controller, methods of controlling these, and a storage medium.

Description of the Related Art

As actions for troubleshooting a product become complex, customers frequently directly question a call-center of a maker to obtain an answer. Japanese Patent Laid-Open No. 2005-208974 proposes a remote support service in accordance with audio or moving image communication and remote operation to readily perform troubleshooting between an image forming apparatus and a call-center. In the remote support service, at a time of an error occurrence in an image forming apparatus, resolution becomes possible by an operator of the call-center conveying an error solving approach to a user directly, without a worker for maintenance going to a site. With this, it becomes possible to shorten the time required to resolve the error.

In the remote support service, trouble-solving is performed while the operator and the user are both looking at a screen of the image forming apparatus, in accordance with a remote operation function. Here, a user may operate the screen in accordance with an instruction by the operator, and the operator may directly operate the screen in accordance with a remote operation. In solving trouble, a function operation in various screens or a setting change operation is performed.

However, there is a problem as is recited below in the foregoing conventional technique. During remote support service, there are many cases in which some kind of problem occurs in the image forming apparatus, such as an image defect for example. In addition, because an operator may operate a screen or a setting of the image forming apparatus by a remote operation, commonly it is desirable for them to concentrate on maintenance work. In other words, during remote support service, causing the image forming apparatus to operate after receiving a normal print job from an external unit is not desirable. However, during remote support service, a request to execute a test print with a purpose such as confirming print quality should be considered.

However, there are image forming systems in which a host computer and an image forming apparatus are connected via an image processing apparatus such as a DFE (Digital Front End). The image processing apparatus processes a print job received from the host computer and then transmits it to the image forming apparatus. Furthermore, print data stored on the image processing apparatus may be transmitted to the image forming apparatus as a print job, and setting information or the like of the image processing apparatus may be transmitted to the image forming apparatus as a print job. Even with such a system configuration, a request during remote support service as previously described should be considered.

SUMMARY OF THE INVENTION

The present invention enables realization of a mechanism by which an image forming apparatus notifies an apparatus that inputs an image forming job to the image forming apparatus that the image forming apparatus is during remote support service, and suitably restricts acceptance of image forming jobs.

One aspect of the present invention provides a remote support system including an image forming apparatus, a printer controller for executing some image processing for the image forming apparatus, and an external terminal, wherein the image forming apparatus comprises a transmission unit configured to, when a remote support service for solving a failure of the image forming apparatus is started in accordance with an instruction of an operator who uses the external terminal, transmit a start notification of the remote support service to the printer controller, and when the remote support service ends, transmit an end notification of the remote support service to the printer controller; the printer controller comprises a reception unit configured to receive the start notification and the end notification transmitted by the transmission unit; a memory device that stores a set of instructions; and at least one processor that executes the instructions to: notify that the image forming apparatus is during remote support service to an apparatus that makes an instruction to the printer controller for a job to be executed by the image forming apparatus, in a duration from when the start notification is received by the reception unit until when the end notification is received.

Another aspect of the present invention provides a printer controller connected to an image forming apparatus, the printer controller comprising: a reception unit configured to, if a remote support service for solving a failure of the image forming apparatus is started in accordance with an instruction of an operator that uses the external terminal, receive a start notification of the remote support service from the image forming apparatus and, if the remote support service is ended, receive an end notification of the remote support service from the image forming apparatus; a memory device that stores a set of instructions; and at least one processor that executes the instructions to: notify that the image forming apparatus is during remote support service to an apparatus that makes an instruction to the printer controller for a job to be executed by the image forming apparatus, in a duration from when the start notification is received by the reception unit until when the end notification is received.

Still another aspect of the present invention provides a method of controlling a remote support system including an image forming apparatus, a printer controller for executing some image processing for the image forming apparatus, and an external terminal, the method comprising: in the image forming apparatus, transmitting a start notification of the remote support service to the printer controller if a remote support service for solving a failure of the image forming apparatus is started in accordance with an instruction of an operator who uses the external terminal, and, if the remote support service is ended, transmitting an end notification of the remote support service to the printer controller; in the printer controller, receiving the start notification and the end notification that are transmitted; in the printer controller, notifying that the image forming apparatus is during remote support service to an apparatus that makes an instruction to the printer controller for a job to be executed by the image forming apparatus, in a duration from when the start notification is received until when the end notification is received.

Yet still another aspect of the present invention provides a method of controlling a printer controller connected to an image forming apparatus, the method comprising: receiving from the image forming apparatus, if a remote support service for solving a failure of the image forming apparatus in accordance with an instruction by an operator using an external terminal is started, a start notification of the remote support service, and receiving from the image forming apparatus an end notification for the remote support service if the remote support service is ended, and notifying that the image forming apparatus is during remote support service to an apparatus that makes an instruction to the printer controller for a job to be executed by the image forming apparatus, in a duration from when the start notification is received until when the end notification is received.

Still yet another aspect of the present invention provides a non-transitory computer-readable storage medium storing a computer program for causing a computer to execute each step in a method of controlling a printer controller connected to an image forming apparatus, the method comprising: receiving, if a remote support service for solving a failure of the image forming apparatus in accordance with an instruction by an operator using an external terminal is started, from the image forming apparatus a start notification of the remote support service, and receiving from the image forming apparatus an end notification for the remote support service if the remote support service is ended, and notifying that the image forming apparatus is during remote support service to an apparatus that makes an instruction to the printer controller for a job to be executed by the image forming apparatus, in a duration from when the start notification is received until when the end notification is received.

Further features of the present invention will be apparent from the following description of exemplary embodiments with reference to the attached drawings.

BRIEF DESCRIPTION OF THE DRAWINGS

FIG. 6 is a block diagram for describing a software configuration of an image processing apparatus according to an embodiment.

FIG. 7 is a block diagram for describing a software configuration of an image forming apparatus according to an embodiment.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

<First Embodiment>
<Configuration of Remote Support System>

Below, explanation will be given for a first embodiment of the present invention. Firstly, with reference to FIG. 1, description is given regarding a network configuration of a remote support system according to the present embodiment. The present system is configured by including a printer controller 101, an MFP 102, a call-center terminal (an external terminal) 103, an HTTP relay server 104, and firewalls (FW) 105 and 106. Each apparatus can communicate via a network 107. The printer controller 101 is an example of an image processing apparatus, is a DFE (Digital Front End) connected to the MFP 102, and performs some processing for the MFP 102, in particular image processing. The MFP (Multifunction Peripheral) 102 is an example of an image forming apparatus.

The printer controller 101 and the call-center terminal 103 operate as mutual communication partners, as apparatuses to which the present invention is applied. The MFP 102 is connected to the printer controller 101 via a local dedicated line. In addition, the printer controller 101 and the call-center terminal 103 are provided with a data communication function for performing data communication by executing call control by HTTP (HyperText Transfer Protocol).

Figure 1:
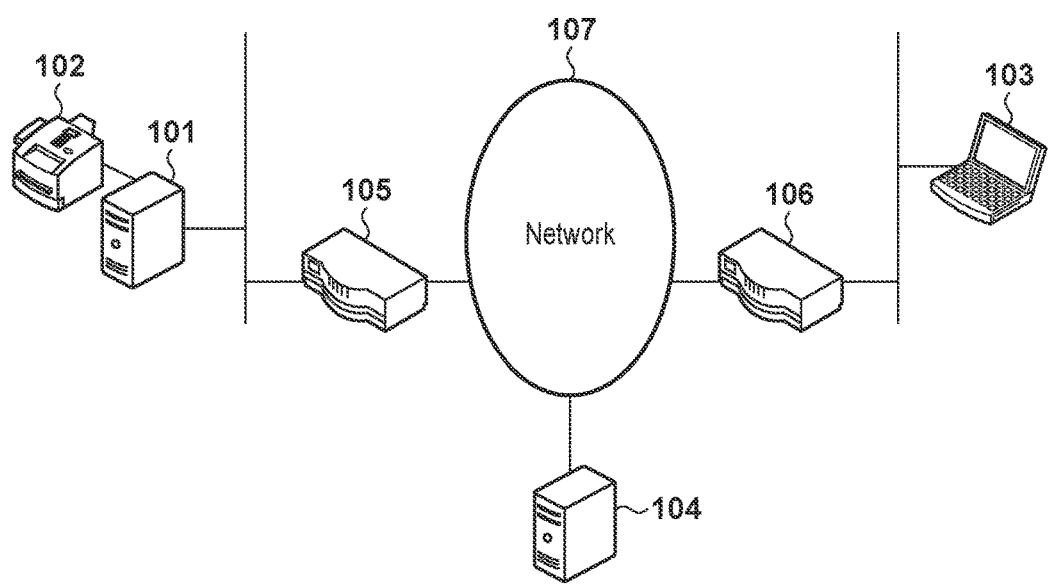
FIG. 1 is a view for schematically illustrating a network configuration according to an embodiment.

In FIG. 1, the printer controller 101 is connected to the network 107 through the firewall (FW) 105. In addition, the call-center terminal 103 on the call-center side is connected to the network 107 through the FW 106. In addition, the HTTP relay server 104 is connected to the network 107. In data communication by HTTP, client nodes perform data communication with each other by performing POST/GET to a URI (Uniform Resource Identifier) provided from the HTTP relay server. Because of this, it is possible for client nodes to perform data communication with each other even if they are blocked by a private address area or a FW. In the present embodiment, the printer controller 101 and the call-center terminal 103 operate as HTTP client nodes. In addition, in the present embodiment, although there is a configuration in which communication between client nodes is performed via FWs with respect to the network 107, configuration may be taken to use a network configuration in which this is not performed via FWs. In addition, more FWs, image forming apparatuses, and operator PCs than those illustrated may be connected to the network 107. In addition, in the present embodiment, configuration may be taken such that HTTP is not used as the communication protocol, and another communication form may be used.

<Hardware Configuration>

Figure 2:
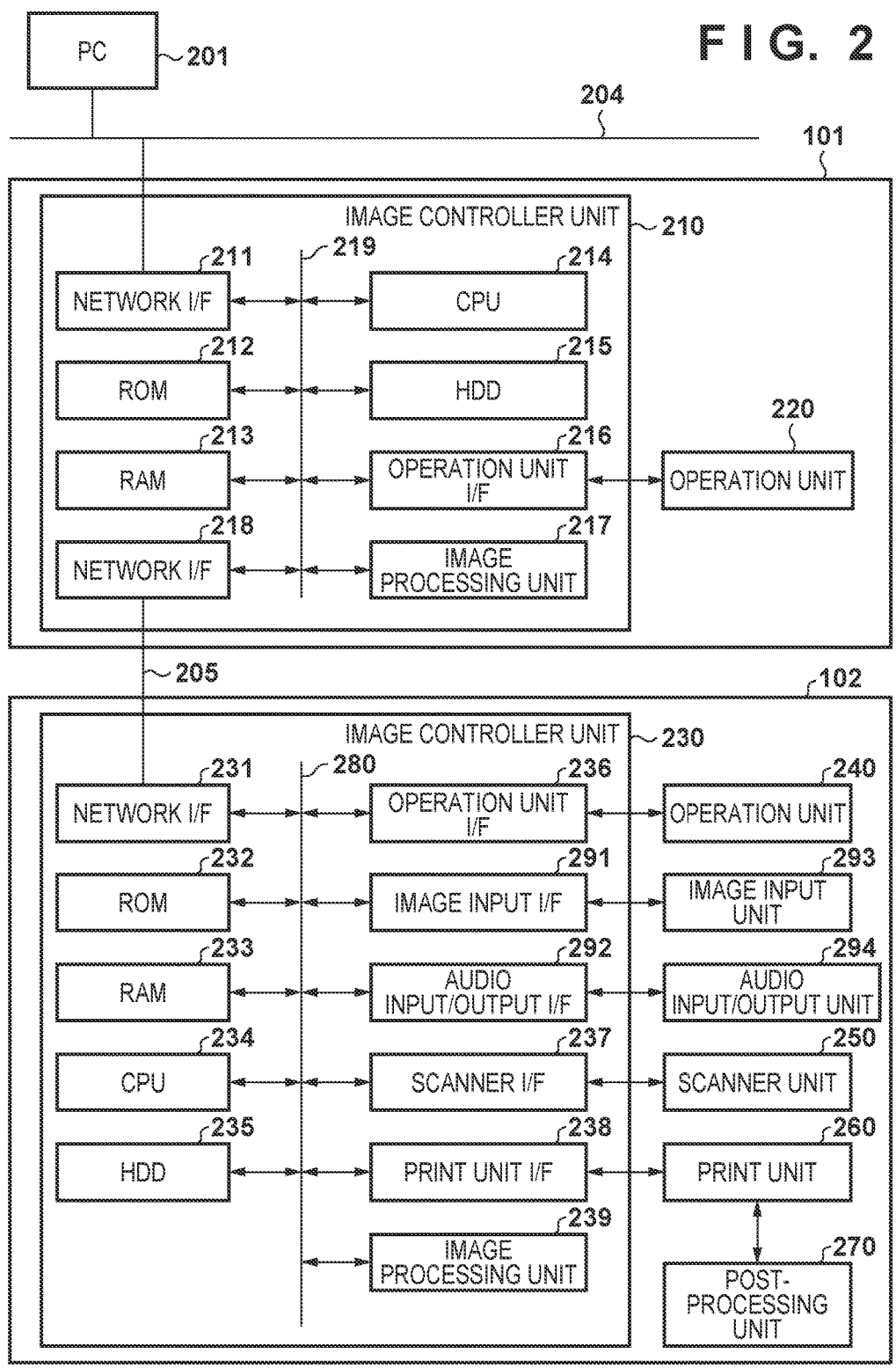
FIG. 2 is a block diagram for schematically illustrating a hardware configuration of an image forming system that includes an image forming apparatus and an image processing apparatus, according to an embodiment.

Next, with reference to FIG. 2, description is given regarding a hardware configuration of a side for performing print processing from among a remote support system according to the present embodiment. The printer controller 101 and the PC 201 are communicably connected via a network 204, and the MFP 102 and the printer controller 101 are connected via a communication line 205. Note that, FIG.

2 exemplifies a case in which one information processing apparatus is provided in a remote support system, but configuration may be taken such that the printer controller 101 and plurality of information processing apparatuses are communicably connected via the network 204.

Firstly description is given regarding the PC 201. The PC 201 can execute various programs such as an application program for an inputting a print job (an image forming job). In addition, a printer driver having a function for converting print data into a printer language supported by the printer controller 101 is installed in the PC 201. A user who wants to perform printing can perform a print instruction from various applications or the like. The printer driver can convert data output by an application based on a print instruction into print data interpretable by the printer controller 101, and transmit the print data to the printer controller 101 which is connected to the network 204.

Note that, in the present embodiment, although a PC is exemplified as an example of an information processing apparatus, for example it may be a mobile information terminal such as a smart phone or a tablet terminal. Note that it is possible to change the method of transmitting print data to the MFP 102 as appropriate. Configuration may be taken so as to transmit print data to the MFP 102 via a driver or an application for printing, and configuration may be taken so as to transmit print data to the MFP 102 via a cloud server.

Next, description is given regarding the printer controller 101. The printer controller 101 is provided with an image controller unit 210 and an operation unit 220. The PC 201 generates a print job based on a user instruction, and transmits the generated print job to the printer controller 101. A network I/F 211 connects the network 204 and the image controller unit 210. A ROM 212 stores various parameters or programs executed by a CPU 214. A RAM 213 is a work memory and a main memory of the CPU 214. In addition, a control program stored in the ROM 212 is deployed to the RAM 213, and the CPU 214 executes the control program deployed to the RAM 213 to comprehensively control an image signal or various devices. An HDD 215 stores large data such as print data.

An operation unit I/F 216 connects the image controller unit 210 and the operation unit 220, and an image processing unit 217 converts print data included in a print job received from the PC 201 into a signal, and transmits it to the MFP 102. A network I/F 218 connects the communication line 205 and the image controller unit 210. The operation unit 220 accepts a user instruction.

Next description is given regarding the MFP 102. The MFP 102 is provided with an image controller unit 230, an operation unit 240, an image input unit 293, an audio input/output unit 294, a scanner unit 250, a print unit 260, and a post-processing unit 270. The MFP 102 has a reading function for reading an image on a sheet, and a print function for printing an image to a sheet. In addition, the MFP 102 has a post-processing function for binding a plurality of sheets to which images have been printed, aligning a plurality of sheets, and dividing a discharging destination of a plurality of sheets among a plurality of trays. Note that a sheet encompasses a paper sheet such as normal paper or thick paper, an OHP sheet, or the like. Below, a sheet is also referred to as a recording medium or print paper.

Note that, in the present embodiment, explanation is given of the MFP 102 as an example of an image forming apparatus, but, for example, configuration may be taken to have an image forming apparatus such as a printer that does not have a reading function. In the present embodiment, as an example an image forming apparatus is assumed to be provided with various constituent elements that are described below.

A network I/F 231 connects the communication line 205 and the image controller unit 230. A ROM 232 stores various parameters or programs executed by a CPU 234. A RAM 233 is a work memory and a main memory of the CPU 234. In addition, a control program stored in the ROM 232 is deployed to the RAM 233, and the CPU 234 executes the control program deployed to the RAM 233 to comprehensively control an image signal or various devices. An HDD 235 stores large-capacity data such as print data.

An operation unit I/F 236 connects the operation unit 240 and the image controller unit 230. An image input I/F 291 connects the image input unit 293 and the image controller unit 230. An audio input/output I/F 292 connects the audio input/output unit 294 and the image controller unit 230. A scanner I/F 237 connects the scanner unit 250 and the image controller unit 230. A print unit I/F 238 connects the print unit 260 and the image controller unit 230. An image processing unit 239 performs image processing—for example, magnification/reduction, rotation, color conversion, and smoothing—on print data received from the printer controller 101 or image data obtained in the scanner unit 250. The operation unit 240 accepts an instruction from a user.

Figure 4:
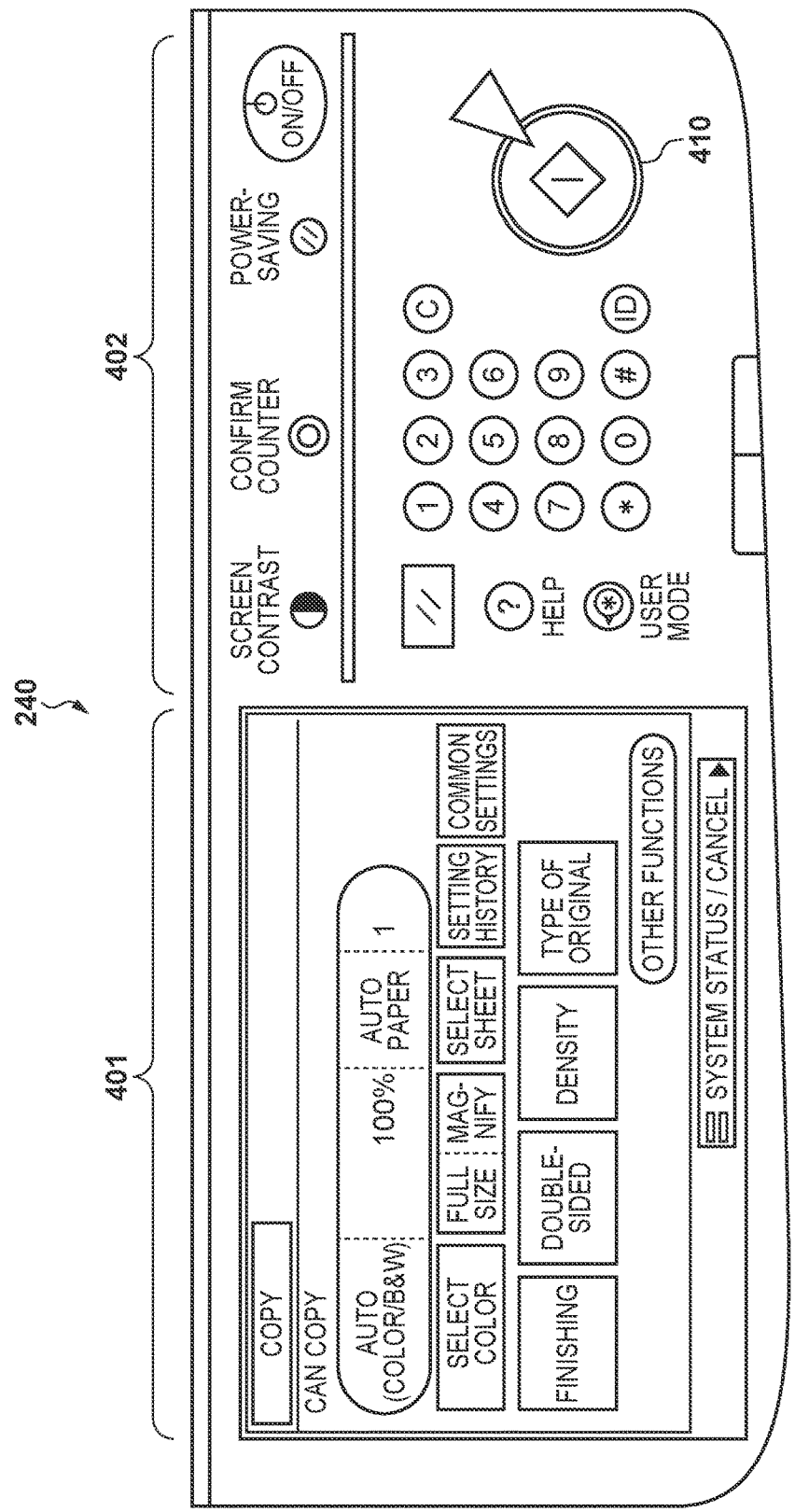
FIG. 4 is a view for illustrating an operation unit of an image forming apparatus according to an embodiment.

Here, with reference to FIG. 4, description is given regarding an example of a configuration of the operation unit 240. The operation unit 240 is comprised from a panel 401 for displaying an operating screen, and a hard key input unit 402. The panel 401 is a touch panel display, for example. The hard key input unit 402 has various hard keys such as a start button 410. A user inputs an instruction by touching a key displayed on the panel 401 or by pressing various hard keys of the hard key input unit 402. Note that the panel 401 may be a display that does not have a touch panel function. In such a case, instead of a key input by a touch operation, a scroll key for selecting a key displayed on the display and a deciding key for deciding this key may be provided as a hard key input unit. The operation unit 240 accepts an instruction from a user via the panel 401 and the hard key input unit 402, and displays an operating screen on the panel 401 as necessary.

The description of FIG. 2 is returned to. The image input unit 293 is an image input apparatus such as a camera. The audio input/output unit 294 is an audio input output apparatus such as a headset. The scanner unit 250 reads an original and generates image data. The print unit 260 prints print data to print paper. The post-processing unit 270 is connected to the print unit 260, and performs finishing processing such as stapling processing, punching processing, saddle stitching processing, and binding processing with respect to print paper to which print data is printed in the print unit 260.

Figure 3:
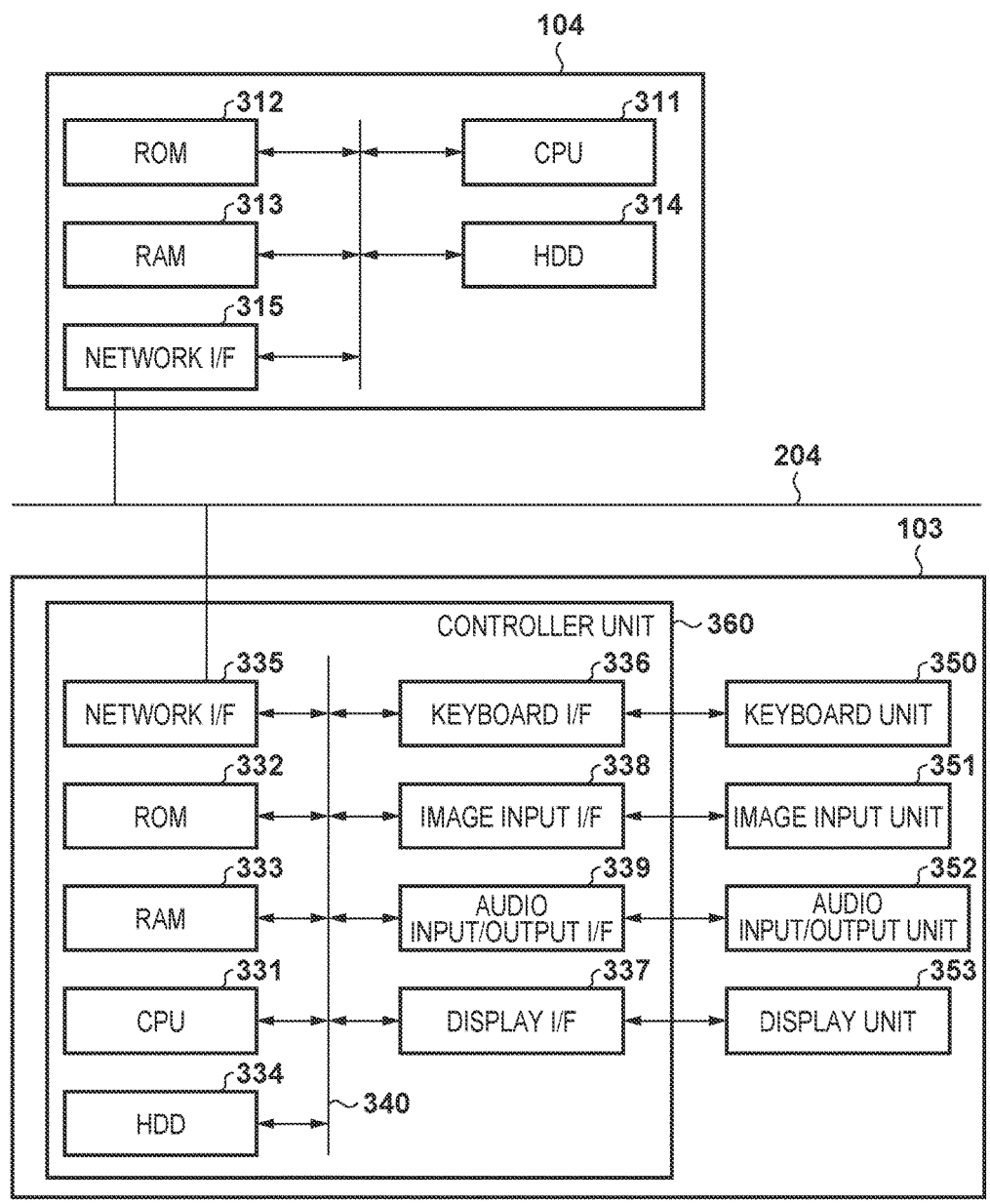
FIG. 3 is a block diagram for schematically illustrating a hardware configuration that includes a call-center terminal and a relay server, according to an embodiment.

Next, with reference to FIG. 3, description is given regarding a hardware configuration of, out of a remote support system according to the present embodiment, a side for providing the remote support service. The HTTP relay server 104 and the call-center terminal 103 are communicably connected via the network 204. As previously explained, the printer controller 101 and the MFP 102 are also communicably connected via the network 204.

In the HTTP relay server 104, the reference numeral 311 is a CPU, and comprehensively controls access to various devices connected to a system bus 320 based on a control program stored in a ROM 312 or a hard disk (HDD) 314. The reference numeral 312 is a ROM, and stores, for example, a control program executable by the CPU 311. The reference numeral 313 is a RAM that mainly functions as a main memory, a work area, or the like of the CPU 311, and it is possible to extend a memory capacity in accordance with an option RAM connected to an expansion port (not shown). The reference numeral 314 is a hard disk (HDD) that stores a boot program, various applications, font data, a user file, an edit file, or the like. Note that, in the present embodiment the HDD 314 is used, but an SD card, a flash memory, or the like may be used as an external storage apparatus apart from the HDD 314. The reference numeral 320 is a system bus. The reference numeral 315 is a network I/F that performs data communication with an external network via a network cable.

The call-center terminal 103 is provided with a controller unit 360, a keyboard unit 350, an image input unit 351, an audio input/output unit 352, and a display unit 353. The reference numeral 331 is a CPU, and comprehensively controls an access with various devices connected to a system bus 340 based on control programs stored in a ROM 332 or a hard disk (HDD) 334. The reference numeral 332 is a ROM, and stores, for example, a control program executable by the CPU 331. The reference numeral 333 is a RAM that mainly functions as a main memory, a work area, or the like of the CPU 331, and it is possible to extend a memory capacity in accordance with an option RAM connected to an expansion port (not shown). The reference numeral 334 is a hard disk (HDD) that stores a boot program, various applications, font data, a user file, an edit file, or the like. Note that, in the present embodiment the HDD 334 is used, but an SD card, a flash memory, or the like may be used as an external storage apparatus apart from the HDD 334.

The reference numeral 340 is a system bus. The reference numeral 335 is a network I/F that performs data communication with an external network via a network cable. The reference numeral 336 is a keyboard I/F that controls a key input from the keyboard unit 350 or a pointing device (not shown). The reference numeral 337 is a display I/F that controls display by the display unit 353. The reference numeral 338 is an image input I/F that controls an image input from the image input unit 351, which is a camera or the like. The reference numeral 339 is an audio input/output me /F for controlling audio input/output with the audio input/output unit 352 which is a headset or the like.

<Screen Examples>

Figure 5:
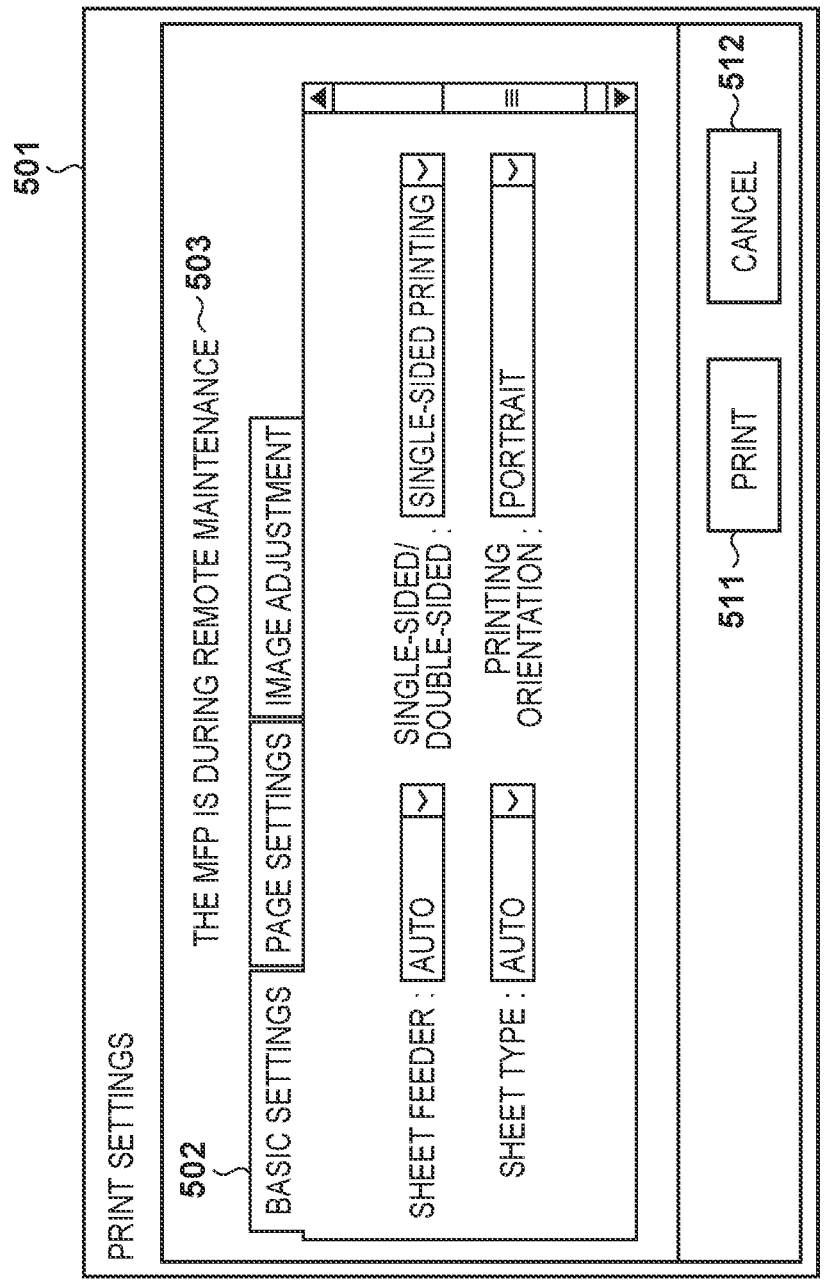
FIG. 5 is a view for illustrating a print dialogue displayed on a PC 201 according to an embodiment.

Next, referring to FIG. 5, explanation is given regarding an example of a screen for a printer driver corresponding to the printer controller 101 that is installed on the PC 201. A user who wants to perform printing can open this screen 501 from various applications and perform a print instruction. The screen 501 indicates a print dialogue screen, and can instruct various settings for printing. Because there are a large number of setting items for print setting, it is difficult to set all of them on the same screen. Consequently, it is often the case that setting is caused to be performed by preparing a plurality of tabs for each setting item as with reference numeral 502, and causing a transition to a separate setting screen.

Reference numeral 502 is for illustrating a screen for when, out of a basic settings tab, a page settings tab, and an image adjustment tab, the basic settings tab is selected. A plurality of setting items are present in each tab, but description thereof is omitted. In the basic settings tab, a plurality of setting items for printing are prepared. Here, from the plurality of setting items, some setting items are illustrated, and for a setting of a feeding unit "auto" is set, for a paper type "auto" is also set, for single side/double side "single-sided printing" is set, and for print orientation "portrait" is set. Note that setting items that a user can set and a number of tabs is not limited to this, and it goes without saying that they increase/decrease in accordance with the functions of the MFP 102 and the printer controller 101.

The reference numeral 511 is a print button, and is pressed when print setting is complete. The reference numeral 512 is a cancel button, and when the cancel button is pressed, the print setting is cancelled, and a screen for before opening the print dialogue is returned to.

The reference numeral 503 is a region for displaying to that effect that the MFP 102 is during remote support service, and, as an example, a message of "The MFP is during remote maintenance" is display above the printer driver. When the remote support service completes, it is desirable to have this message be hidden. In the present embodiment, an example of displaying a message of during remote support service on a printer driver was illustrated, but there is no limitation to this. For example, configuration may be taken so as to display it on an application for printing, or a print job management tool or utility that operates on the PC. In addition, configuration may be taken to have a configuration of notifying by audio or the like instead of displaying on a screen described above or the like.

<Software Configuration>

Next, with reference to FIG. 6, description is given regarding an example of a configuration of a software module 600 of the printer controller 101. The software module 600 of FIG. 6 is stored in the ROM 212 or the HDD 215, and is implemented by the CPU 214 executing the software module 600 which is deployed to the RAM 213. The software module 600 of the printer controller 101 is configured by including modules indicated below.

A job acceptance unit 601 receives a print job from the PC 201 and transmits it to a print queue 606. The print queue 606 temporarily stores all print jobs received by the printer controller 101, to control an order of the print jobs. In addition, the job acceptance unit 601 accepts a user instruction by the operation unit 220, and also instructs a job generation unit 602 for generation of a print job based on the user instruction. Specifically, when a user has instructed a test print (image forming of a test page) or instructed printing of information relating to a setting of the printer controller 101, the job acceptance unit 601 instructs the job generation unit 602 for generation of a print job. Furthermore, when printing of print data stored in the HDD 215 is instructed via the operation unit 220, the job acceptance unit 601 instructs the job generation unit 602 for generation of a print job. The job generation unit 602 generates a print job based on a user instruction accepted by the job acceptance unit 601. For example, when printing of information regarding the printer controller 101 is instructed via the operation unit 220, the job generation unit 602 generates a print job for the information regarding the printer controller 101. Next, a job management unit 607 transmits the job to a job analysis unit 603.

The job analysis unit 603 analyzes all print jobs to be transmitted to the MFP 102, for example a print job generated by the job generation unit 602, or a print job received from the PC 201 by the job acceptance unit 601. Specifically, for example, information relating to user information included in the print job, a type of print paper (sheet, recording medium), a size of the print paper, a paper feed tray for supplying the print paper to the MFP 102 at a time of printing, and finishing processing is obtained.

The job management unit 607 determines whether a print job analyzed by the job analysis unit 603 can be printed by the MFP 102. Whether printing is possible is determined in accordance with a flowchart of FIG. 10 that is described later, and if printing is possible, the print job is transmitted to a print data rasterization unit 604. The print data rasterization unit 604 generates bitmap data based on print data included in the print job to be transmitted to the MFP 102. A print data transfer unit 605 transmits bitmap data to the MFP 102.

A display management unit 608 performs management of a display based on the state of the MFP 102. In the present embodiment, if the MFP 102 is during remote support service, that "The MFP is during remote maintenance" as illustrated in FIG. 5 is made known to a user. Specifically, this is made known to a user by displaying the above-described details in, for example, an application, a utility, or a driver installed on the PC 201 or the operation unit 220 of the printer controller 101. An MFP status receiving unit 609 receives from the MFP 102 a state of the MFP 102—in other words whether the MFP 102 is during remote support service, and notifies this state to the job management unit 607 and the display management unit 608.

Next, with reference to FIG. 7, description is given regarding an example of a configuration of a software module 700 of the MFP 102. The software module 700 of FIG. 7 is stored in the ROM 232 or the HDD 235, and is implemented by the CPU 234 executing the software module 700 which is deployed to the RAM 233. The software module 700 of the MFP 102 is configured by including modules indicated below.

An UI unit 701, via the operation unit I/F 236, performs display control of the operation unit 240 and controls input of various setting information set in the operation unit 240. Acceptance of a remote support service via the operation unit 240 is performed here. In accordance with an instruction for start/end of a session received from the UI unit 701, the session management unit 702 makes an instruction for data transmission/reception for session management to the HTTP control unit 704. A support data communication control unit 703 makes a transmission/reception instruction for data relating to support details, such as a remote operation command or media data, to the HTTP control unit 704. In addition, the support data communication control unit 703 performs input and output of audio or image data via the operation unit I/F 236, the image input I/F 291, and the audio input/output I/F 292, as necessary. The HTTP control unit 704 performs transmission and reception of data by HTTP.

A print job control unit 705 transmits a print job received from the printer controller 101 to a print settings analysis unit 706. The print settings analysis unit 706 analyzes the print job received by the MFP 102. As a result of the analysis, for example, information relating to user information included in the print job, a type of print paper (sheet, recording medium), a size of the print paper, a paper feed tray for supplying the print paper to the MFP 102 at a time of printing, and finishing processing is obtained. The obtained print setting is stored in the RAM 233 or the HDD 235. A print data rasterization unit 707 executes color conversion processing on the bitmap data so that color is appropriately added to a print result, and performs a conversion to print data that can be interpreted by the print unit 260. A print data transfer unit 708 transfers the print data to the print unit 260.

<Processing Procedure>

Figure 8:
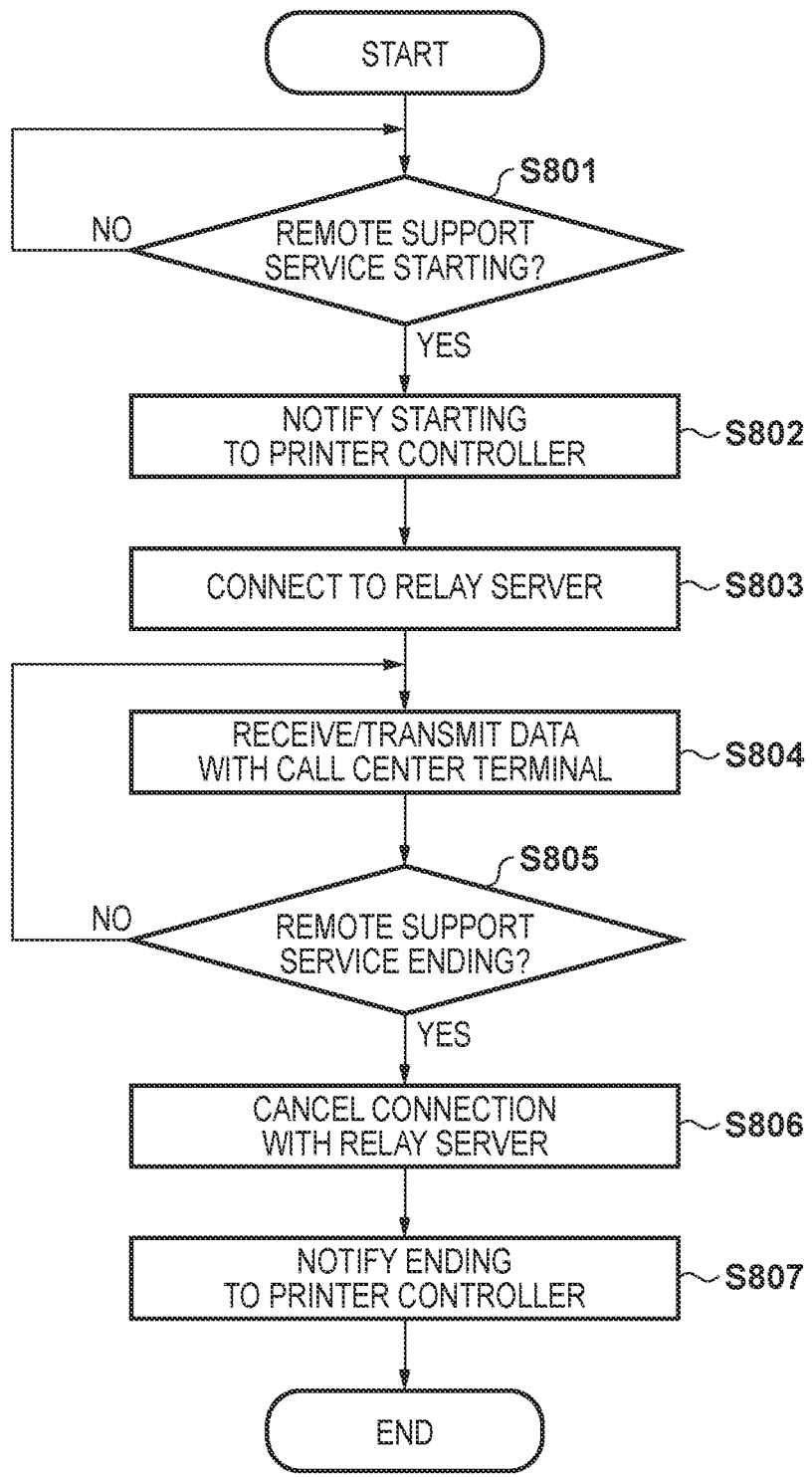
FIG. 8 is a flowchart for describing a method of controlling an image forming apparatus according to an embodiment.

Next, referring to FIG. 8, description is given regarding a processing procedure for starting and ending the remote support service in the MFP 102. The processing described below is realized by the CPU 234 reading a control program stored in the ROM 232 or the HDD 235 into the RAM 233, and executing it. When starting of the remote support service is instructed from a user via the operation unit 240, the CPU 234 executes the control program corresponding to the flowchart illustrated in FIG. 8.

In step S801, the UI unit 701 accepts starting of the remote support service from the operation unit 240. Upon starting of the remote support service being instructed in step S801, in step S802 the UI unit 701 notifies starting of the remote support service to the MFP status receiving unit 609 of the printer controller 101 (transmits a start notification). In step S803, the HTTP control unit 704 makes an HTTP connection to the HTTP relay server 104.

In step S804, the support data communication control unit 703 performs transmission and reception of audio, video and remote control data with the call-center terminal 103 until the remote support service ends. Because of this, the remote support service is provided, and it is possible to perform trouble solving while an operator of the call-center and a user are both viewing a screen on the MFP 102. A user may operate the screen to change a setting in accordance with an instruction from the call-center side, and the call-center side may change a setting by a remote operation.

When the trouble is solved and the remote support service ends, an end instruction is performed from the user to the operation unit 240 of the MFP 102. In step S805, the CPU 234 determines whether the above end instruction has been accepted. Upon receiving the end instruction, the processing proceeds to step S806, and the HTTP control unit 704 cancels the connection with the HTTP relay server 104. Thereafter, in step S807 the UI unit 701 notifies ending of the remote support service to the MFP status receiving unit 609 of the printer controller 101 (transmits an end notification), and ends the processing.

Figure 9:
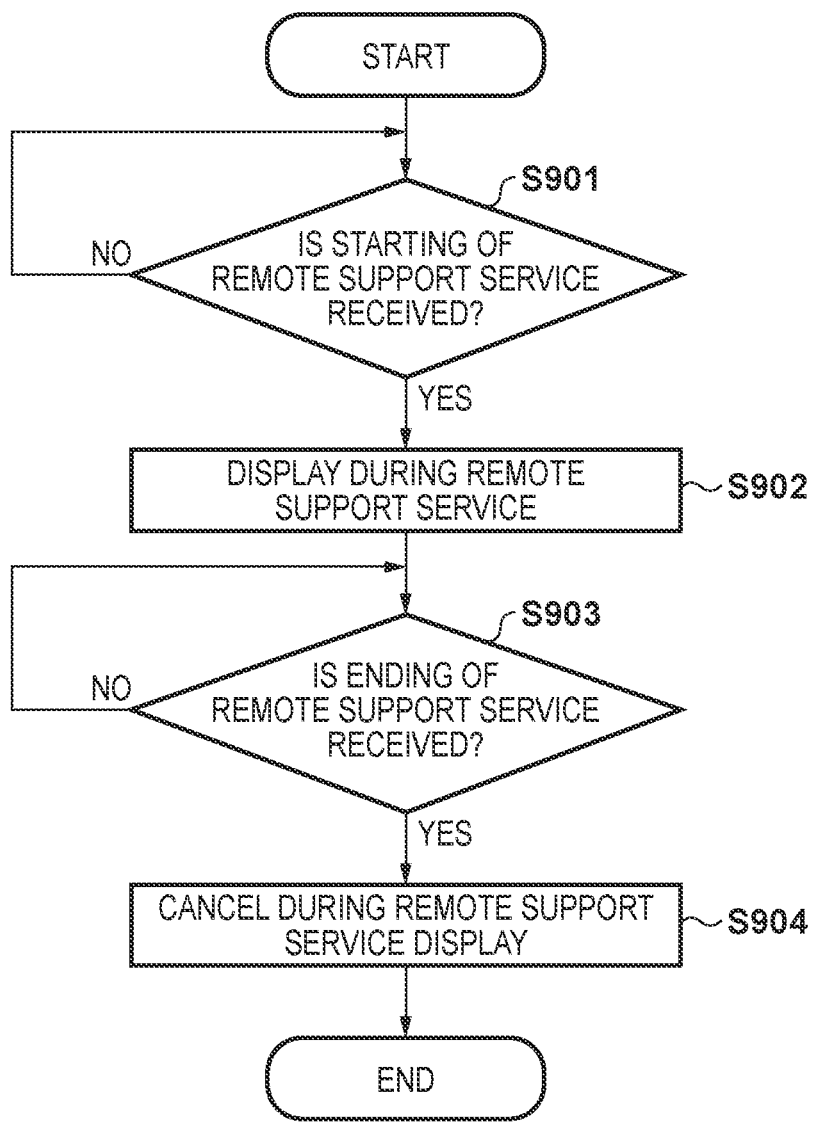
FIG. 9 is a flowchart for describing a method of controlling an image processing apparatus according to an embodiment.

Next, referring to FIG. 9, description is given regarding a processing procedure for starting and ending the remote support service in the printer controller 101. The processing described below is realized by the CPU 214 reading a control program stored in the ROM 212 or the HDD 215 into the RAM 213, and executing it. When starting of the remote support service is notified from the MFP 102 (step S802), the CPU 214 executes the control program corresponding to the flowchart illustrated in FIG. 9.

In step S901, the MFP status receiving unit 609 receives the start notification of the remote support service from the UI unit 701 of the MFP 102. Upon receiving, the processing proceeds to step S902, and the MFP status receiving unit 609 notifies that state to the job analysis unit 603 and the display management unit 608. Furthermore, the display management unit 608 causes a message of "The MFP is during remote maintenance" as illustrated in FIG. 5 to be displayed by an application, a utility, or a driver installed on the PC 201, or the operation unit 220 of the printer controller 101. It is desirable for display of the message to continue until ending of the remote support service is notified from the MFP 102.

In step S903, the MFP status receiving unit 609 receives from the UI unit 701 of the MFP 102 an end notification for the remote support service to the MFP status receiving unit 609 of the printer controller 101. Upon receiving, the processing proceeds to step S904, and the MFP status receiving unit 609 notifies that state to the job analysis unit 603 and the display management unit 608. The display management unit 608 cancels the above-described message display and ends processing.

Figure 10:
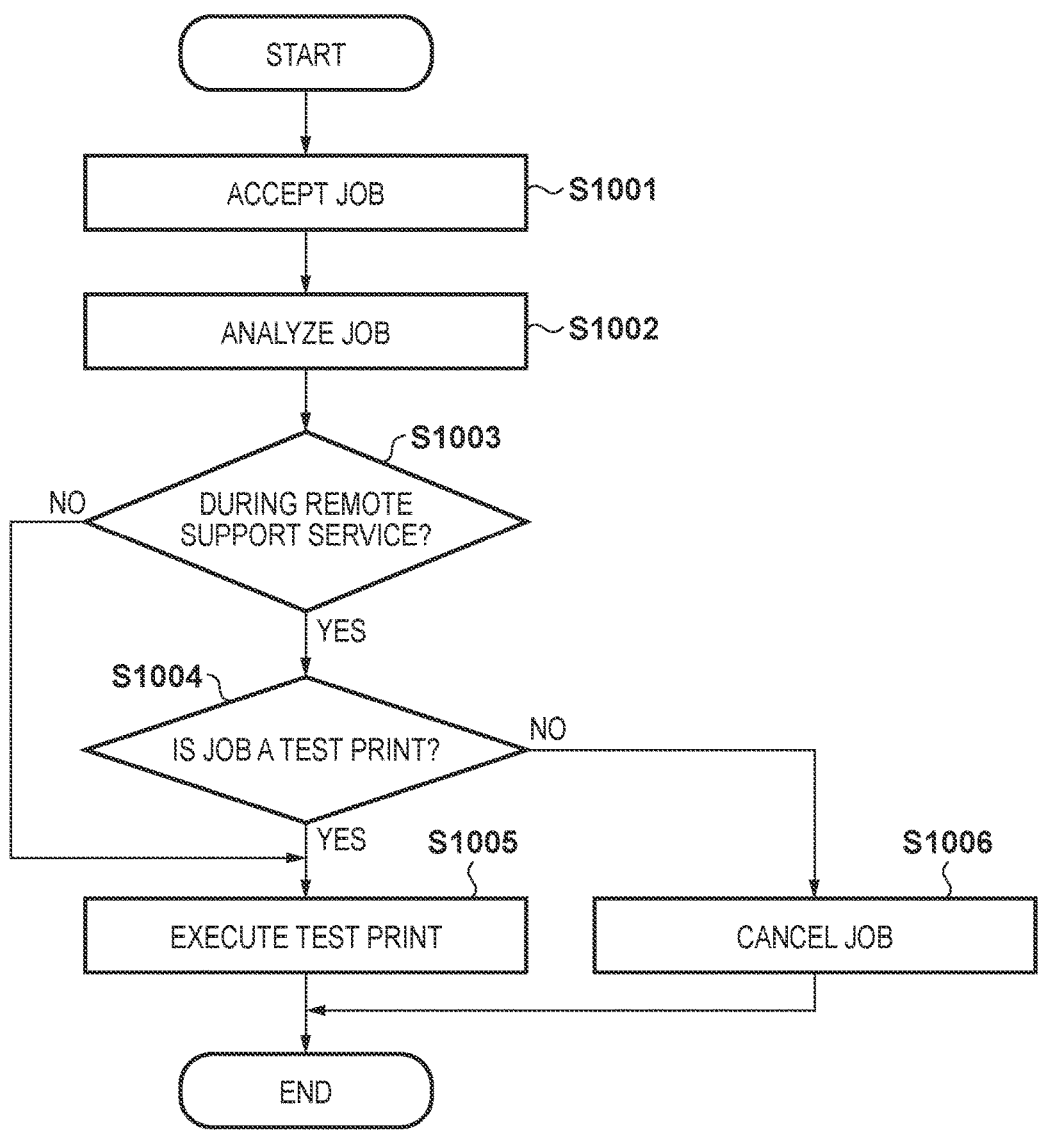
FIG. 10 is a flowchart for describing a job control method of an image processing apparatus according to an embodiment.

Next, with reference to FIG. 10, description is given regarding a processing procedure in the printer controller 101 for a print job input during remote support service. The processing described below is realized by the CPU 214 reading a control program stored in the ROM 212 or the HDD 215 into the RAM 213, and executing it.

In step S1001, the job acceptance unit 601 accepts a print job (an image forming job) from the PC 201. Note that a print job may be accepted via the operation unit 240 of the MFP 102. Specifically, when a user has instructed a test print (image forming of a test page) or instructed printing of information relating to a setting of the printer controller 101, the job acceptance unit 601 instructs the job generation unit 602 for generation of a print job. In addition, the job acceptance unit 601 also instructs generation of a print job to the job generation unit 602 when there is an instruction via the operation unit 220 for printing of print data stored in the HDD 215. The job generation unit 602 generates a print job based on a user instruction accepted by the job acceptance unit 601. For example, when printing of information regarding the printer controller 101 is instructed via the operation unit 220, the job generation unit 602 generates a print job for the information regarding the printer controller 101. Next, after temporarily storing the job in the print queue 606, the job management unit 607 transmits the job to the job analysis unit 603.

In step S1002, the job analysis unit 603 analyzes all print jobs to be transmitted to the MFP 102, for example a print job generated by the job generation unit 602, or a print job received from the PC 201 by the job acceptance unit 601. Next, in step S1003, the job management unit 607 determines whether the MFP 102 is during remote support service based on the status information (reception status of the start notification and the end notification) of the MFP 102 received by the MFP status receiving unit 609. In the case of during remote support service (information is obtained from the MFP 102 in step S901), the processing proceeds to step S1004. When the MFP 102 is not during remote support service, printing is determined to be possible, the processing proceeds to step S1005, and the job generation unit 602 transmits the generated print job to the print data rasterization unit 604 to execute printing.

In step S1004, the job management unit 607 determines whether the print job is a test print, based on the analysis result in step S1002. If it is a test print, the processing proceeds to step S1005 and the print job is executed, and if that is not the case the processing proceeds to step S1006 and the print job is cancelled. Note that, although description was given here regarding a determination of whether a print job is a test print as the determination of step S1004, but the present invention is not limited to this. For example, configuration may be taken to determine whether a print job is something generated by the job generation unit 602, and in the case of a job generated by the job generation unit 602, the processing proceeds to step S1005 and printing is executed. Furthermore, if the print job is not something generated by the job generation unit 602—in other words a case of a print job input from an external PC 201 or the like—the print job is cancelled without the print job being transmitted to the MFP 102. In this way, by virtue of the present embodiment, during remote support service, control is performed to execute a print job necessary to solve the failure of the MFP 102, for example a test print or the like, and cancel a print job for a job other than this.

In addition, in determining whether a print job is a test print, it is not desirable to make the determination only by whether it was generated by the job generation unit 602. For example, even with a job from an external unit, it is desirable to control so that user information of the print job is referenced against the job analysis unit 603 and printing is executed if the print job was issued in accordance with an administrator authority. As a reason for permitting printing by an administrator authority, this is because, for example, a case in which an operator of a call-center instructs printing from a remote location during remote support service, or a case in which a user who is receiving remote support service wishes to execute a particular print job from an external unit can be considered.

In addition, configuration may be taken so that a cancelled job is temporarily stored in a print queue, and the job management unit 607 restarts printing upon reception of the end notification of the remote support service (step S903). In this way, in the present embodiment, if an image forming apparatus is during remote support service, it is possible to notify a user that it is during remote support service, and it is also possible to restrict acceptance of print jobs other than necessary printing.

<Second Embodiment>

Below, explanation will be given for a second embodiment of the present invention. In the above first embodiment, discussion was given regarding a form for, if an image forming apparatus is during remote support service, notifying a user that it is during remote support service and restricting acceptance of print jobs other than necessary printing. Specifically, a form in which a print job other than necessary printing was cancelled in the printer controller 101 was taken. Explanation was given for a configuration in which a cancelled job is temporarily stored in a print queue, and printing being restarted when the remote support service ends.

However, a user described in the above first embodiment is often a person in charge within an office or a site, and here there may exist a case in which the user, because they grasp the situation within the office or site, does not mind if normal print jobs are mixed to a certain extent even during remote support service. In other words, although it is typically desirable to concentrate on maintenance work during remote support service, in accordance with a use environment for a user, a request to permit printing of a normal print job may be present, even during remote support service. Accordingly, in the present embodiment, description is given regarding a form of causing operation of a print job input during remote support service to be selectable by a user.

<Setting Screen Example>

Figure 11:
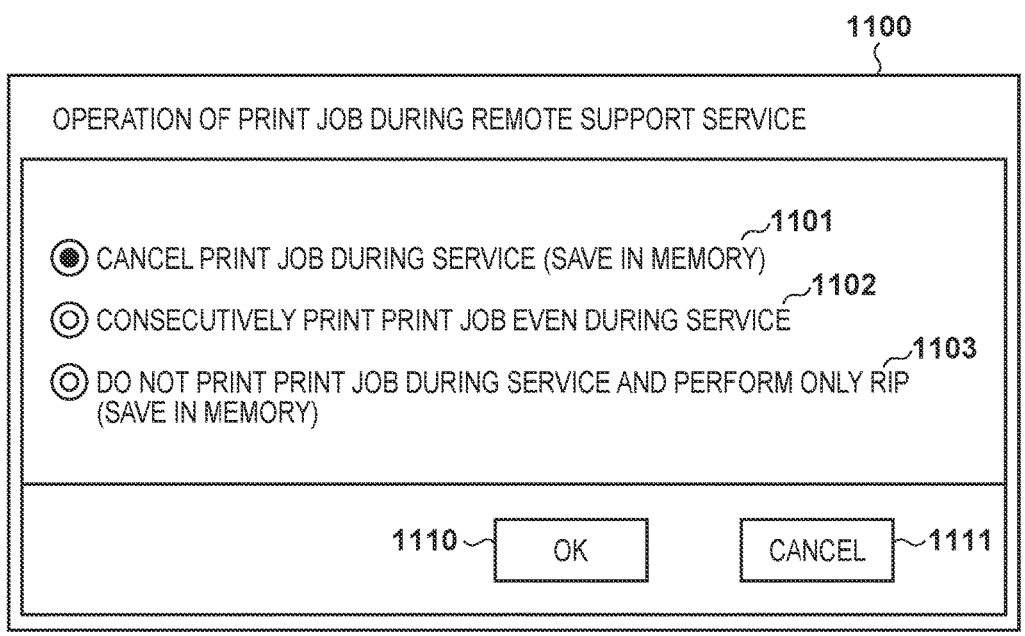
FIG. 11 is a view for describing a job control method displayed on an operation unit of an image forming apparatus according to an embodiment.

With reference to FIG. 11, description is given regarding a setting screen 1100 that is displayed on the operation unit 220 by the UI unit 701 of the MFP 102 when remote support service is started in step S801 of FIG. 8. The setting screen 1100 is a screen for causing a user to select operation of a print job during remote support service.

In the setting screen 1100 there are three choices, and it is possible to perform selection by selecting a respective radio button. Reference numeral 1101 is for instructing so as to cancel a print job during remote support service, and temporarily store it in the print queue 606. Note that, even in this case, a necessary print job such as a test print is executed as described in the above first embodiment. Reference numeral 1102 is for instructing so as to consecutively print print jobs during remote support service. In other words, the printer controller 101 does not perform control of print jobs whatsoever, and print jobs are handled similarly to in a case where remote support service has not been started. Reference numeral 1103 is for instructing so as to perform only RIP (analysis of a print job by the job analysis unit 603 and bitmap data generated by the print data rasterization unit 604) without printing a print job during remote support service, and to temporarily store it in the print queue 606. That it is possible to promptly restart printing after the remote support service has ended can be given as a merit of saving data after RIP, for example. Because a file having a large size may take time for RIP, it is possible to shorten time when restarting printing.

In step S802 of FIG. 8, the MFP 102 notifies a start notification of the remote support service to the printer controller 101, but at this point, selection information for which of the three choices has been selected is simultaneously notified to the printer controller 101. The job management unit 607 of the printer controller 101 performs processing as in FIG. 12 in accordance with the selected setting value.

<Processing Procedure>

Figure 12:
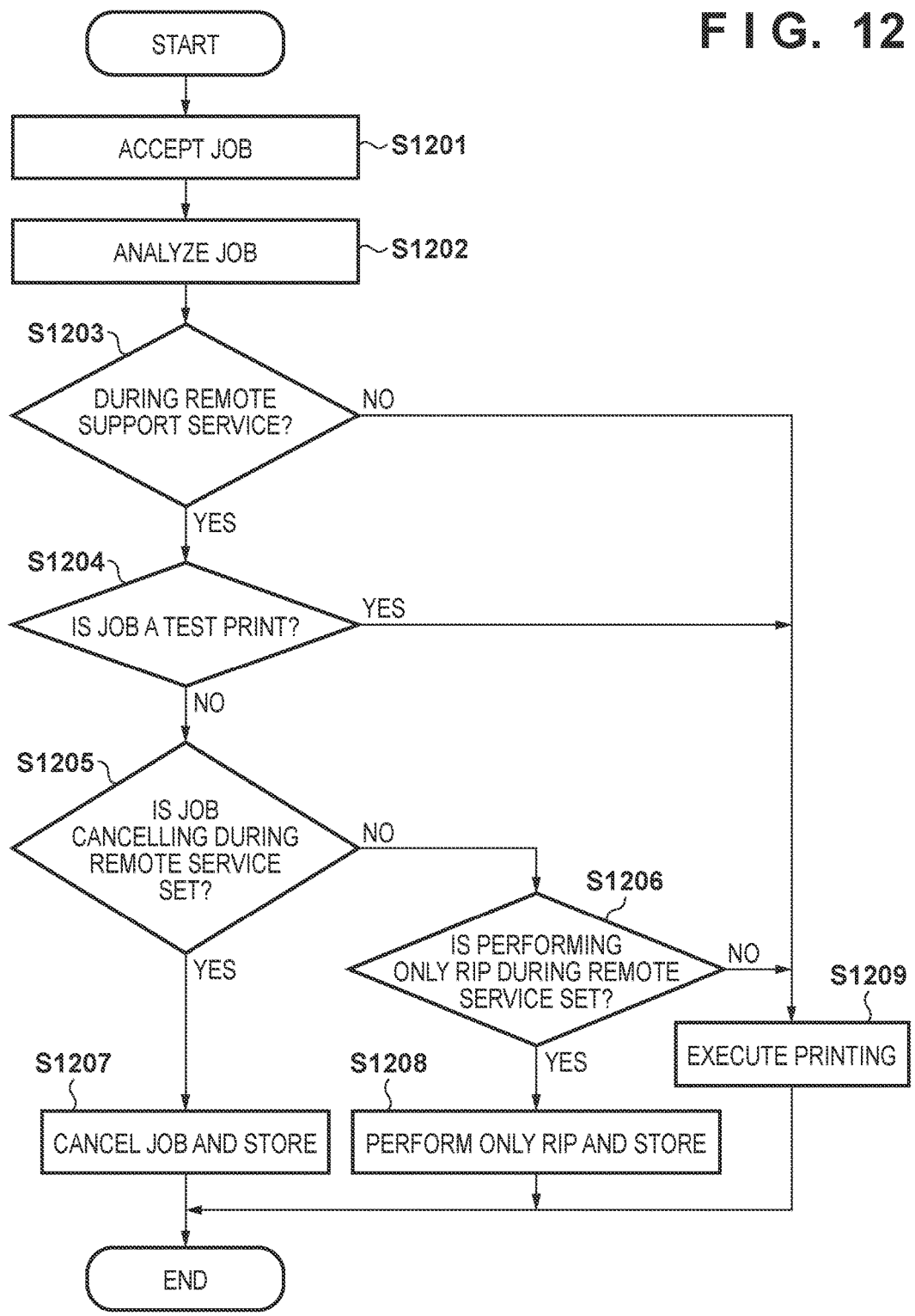
FIG. 12 is a flowchart for describing a job control method of an image processing apparatus according to an embodiment.

Next, with reference to FIG. 12, description is given regarding a processing procedure in the printer controller 101 in the present embodiment for a print job input during remote support service. The processing described below is realized by the CPU 214 reading a control program stored in the ROM 212 or the HDD 215 into the RAM 213, and executing it.

Firstly, in step S1201, the job acceptance unit 601 accepts a print job from the PC 201. Note that a print job may be accepted via the operation unit 240 of the MFP 102. Here, when a user has instructed a test print or when printing of information relating to a setting of the printer controller 101 is instructed, the job acceptance unit 601 instructs generation of a print job to the job generation unit 602. In addition, the job acceptance unit 601 also instructs generation of a print job to the job generation unit 602 when there is an instruction via the operation unit 220 for printing of print data stored in the HDD 215. The job generation unit 602 generates a print job based on a user instruction accepted by the job acceptance unit 601. For example, when printing of information regarding the printer controller 101 is instructed via the operation unit 220, the job generation unit 602 generates a print job for information regarding the printer controller 101. Next, after temporarily storing the job in the print queue 606, the job management unit 607 transmits the job to the job analysis unit 603.

In step S1202, the job analysis unit 603 analyzes all print jobs to be transmitted to the MFP 102, for example a print job generated by the job generation unit 602, or a print job received from the PC 201 by the job acceptance unit 601. Next, in step S1203, the job management unit 607 determines whether the MFP 102 is during remote support service based on the status information of the MFP 102 received by the MFP status receiving unit 609. In the case of during remote support service (information is obtained from the MFP 102 in step S901), the processing proceeds to step S1204. When the MFP 102 is not during remote support service, printing is determined to be possible, the processing proceeds to step S1209, and the job generation unit 602 transmits the generated print job to the print data rasterization unit 604 to execute printing.

In step S1204, the job management unit 607 determines whether the print job is a test print. If it is a test print, the processing proceeds to step S1209 and a print job is executed, and if that is not the case the processing proceeds to step S1205. Note that, although description was given here regarding a determination of whether a print job is a test print as the determination of step S1204, but the present invention is not limited to this. For example, configuration may be taken to determine whether a print job is something generated by the job generation unit 602, and in the case of a job generated by the job generation unit 602, the processing proceeds to step S1204 and printing is executed. Furthermore, if the print job is not something generated by the job generation unit 602—in other words a case of a print job input from an external PC 201 or the like—the print job is cancelled without the print job being transmitted to the MFP 102.

The description given here is similar to the description of step S1004 in the above first embodiment. However, by virtue of the present invention, in a case where a print job is not a necessary print job such as a test print, the print job is further controlled based on selection information set via the setting screen 1100. For example, if the print job is not something generated by the job generation unit 602—in other words a case of a print job input from an external PC 201 or the like—an operation is switched in accordance with a setting value (selection information) selected by FIG. 11.

Specifically, in step S1205, the job management unit 607 determines whether the "cancel print job during service" by reference number 1101 in FIG. 11 is selected. If set, the processing proceeds to step S1207, and the job management unit 607 cancels the print job and temporarily saves it in the print queue 606. In addition, if the "do not print print job during service and perform only RIP" is selected by reference numeral 1103, the processing proceeds to step S1208, and the job management unit 607 performs only RIP for the print job and temporarily stores it in the print queue 606. If "consecutively print print job even during service" is selected by reference numeral 1102, the processing proceeds to step S1209, and the job generation unit 602 transmits the generated print job to the print data rasterization unit 604, and executes printing. In addition, configuration may be taken such that, for a job temporarily saved after job cancellation or a job saved after performing only RIP, the job management unit 607 restarts printing upon receiving an end notification of the remote support service (step S903).

In this way, in the present embodiment, if an image forming apparatus is during remote support service, it is possible to notify a user that it is during remote support service, and it is also possible to switch an operation for a print job in accordance with a user's request. Accordingly, it is further possible to flexibly perform control desired by a user while having the effect in the above first embodiment.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-008287 filed on Jan. 19, 2016, which is hereby incorporated by reference herein in its entirety.

What is claimed is:

1. A remote support system including an image forming apparatus, a printer controller for transferring at least a print job to execute image processing in the image forming apparatus, wherein the printer controller has an operation display unit for managing the print job, an external terminal, and a relay server that relays information for performing a remote support service between the image forming apparatus and the external terminal, and wherein
the image forming apparatus comprises
a memory device that stores a set of instructions; and
at least one processor that executes the instructions to:
transmit, in a case where the remote support service for performing maintenance of the image forming apparatus is started, a start notification of the remote support service to the printer controller; and
the printer controller comprises:
a memory device that stores a set of instructions; and
at least one processor that executes the instructions to:
receive the transmitted start notification; and
notify, based on the received start notification, an instruction apparatus that makes an instruction to the printer controller which transmits the print job to be executed by the image forming apparatus, of information regarding the remote support service and a notification causing the operation display unit of the printer controller for managing the print job to display a display indicating that the image forming apparatus accepts the remote support service,
wherein the at least one processor of the printer controller further executes the instructions to:
accept a job to be executed by the image forming apparatus; and
restrict execution of the job based on whether or not the remote support service is being performed,
wherein the image forming apparatus further comprises:
a memory device that stores a set of instructions; and
at least one processor that executes the instructions to
set setting information about a job accepted during the remote support service, and
transmit the start notification and the set setting information to the printer controller, and
wherein the at least one processor of the printer controller further executes the instructions to:
restrict execution of the job based on the setting information.

2. The remote support system according to claim 1, wherein the at least one processor of the printer controller further executes the instructions to:
cause a display unit of the instruction apparatus to display information indicating the remote support service for the image forming apparatus is being performed.

3. The remote support system according to claim 1, wherein
the at least one processor of the printer controller further executes the instructions to:
restrict execution of the accepted job in a case where it is determined that the remote support service is being performed, and
permit execution of the accepted job and transfer data regarding the job to the image forming apparatus in a case where it is determined that the remote support service is not being performed.

4. The remote support system according to claim 3, wherein
the at least one processor of the printer controller further executes the instructions to:
permit execution of the accepted job and transfer data regarding the job to the image forming apparatus in a case where it is determined based on a job type that there is a necessity to execute the job, even if it is determined that the remote support service is being performed.

5. The remote support system recited in claim 4, wherein in a case where the accepted job is a job for performing image forming of a test page related to the remote support service, it is determined that there is a necessity to execute the job.

6. The remote support system according to claim 1, wherein a setting for restricting execution of a job during the remote support service, a setting for permitting execution of a job even during the remote support service, and a setting for restricting execution of a job during the remote support service and also temporarily saving corresponding data after executing image processing in the printer controller, are allowed to be set as the setting information about the job accepted during the remote support service.

7. The remote support system according to claim 1, wherein
the at least one processor of the printer controller further executes the instructions to:
save data relating to the job in a case where execution of the job is restricted.

8. The remote support system according to claim 1, wherein the at least one processor of the image forming apparatus further executes the instructions to:
transmit, in a case where the remote support service ends, an end notification of the remote support service to the printer controller; and
wherein the at least one processor of the print controller further executes the instructions to:
notify, based on the start notification and the end notification, the instruction apparatus of information indicating that the image forming apparatus is in a state of remote support service.

9. The remote support system according to claim 1, wherein the print controller is a Digital Front End (DFE) which performs rasterization of print data.

10. The system according to claim 1, wherein the printer controller controls to execute a print job for test print and not to allow executing a print job which is not for test printing when the printer controller identifies that the image forming apparatus accepts the remote support service.

11. A printer controller connected to an image forming apparatus, the printer controller comprising:
a memory device that stores a set of instructions; and at least one processor that executes the instructions to:
transmit a print job to the image forming apparatus;
display, on an operation display unit, a management display for managing a print job to be processed by the image forming apparatus;
receive, from the image forming apparatus, in a case where a remote support service for performing maintenance of the image forming apparatus is started between an external apparatus and the image forming apparatus via a relay server, a start notification of the remote support service; and
notify a notification on the operation display based on the received start notification, wherein the notification includes information indicating that the image forming apparatus accepts the remote support service,
wherein the printer controller controls to execute a print job for test printing and not to allow executing a print job which is not for test printing when the printer controller identifies that the image forming apparatus accepts the remote support service.

12. The printer controller according to claim 11, wherein the at least one processor of the printer controller further executes the instructions to:
accept a job to be executed by the image forming apparatus; and
restrict execution of the job based on whether or not the remote support service is being performed.

13. The printer controller according to claim 11, wherein the at least one processor of the image forming apparatus further executes the instructions to:
receive, from the image forming apparatus, in a case where the remote support service ends, an end notification of the remote support service; and
notify, based on the received start notification and the received end notification, the instruction apparatus of the information indicating that the image forming apparatus is in a state of remote support service to.

14. The printer controller according to claim 11, wherein the print controller is a Digital Front End (DFE) which performs rasterization of print data.

15. A method of controlling a remote support system including an image forming apparatus, a printer controller for transferring at least a print job to execute image processing in the image forming apparatus, wherein the printer controller has an operation display unit for managing the print job, an external terminal, and, a relay service that relays information for performing a remote support service between the image forming apparatus and the external terminal, the method comprising:
in the image forming apparatus, transmitting a start notification of the remote support service to the printer controller in a case where the remote support service for performing a maintenance of the image forming apparatus is started;
in the printer controller, receiving the transmitted start notification;
in the printer controller, notifying, based on the received start notification, an instruction apparatus that makes an instruction to the printer controller which transmits the print job to be executed by the image forming apparatus, of information regarding the remote support service and a notification causing the operation display unit of the printer controller for managing the print job to display a display indicating that the image forming apparatus accepts the remote support service;
in the printer controller, accepting a job to be executed by the image forming apparatus;
in the printer controller, restricting execution of the job based on whether or not the remote support service is being performed;
in the image forming apparatus, setting job setting information about a job accepted during the remote support service;
in the image forming apparatus, transmitting the start notification and the set job setting information to the printer controller; and
in the printer controller, restricting execution of the job based on the job setting information.

16. A method of controlling a printer controller connected to an image forming apparatus, the method comprising:
transmitting a print job to the image forming apparatus;
displaying, on an operation display unit, a management display for managing a print job to be processed by the image forming apparatus;
receiving, from the image forming apparatus, in a case where a remote support service for performing maintenance of the image forming apparatus is started between an external apparatus and the image forming apparatus via a relay server, a start notification of the remote support service;
notifying a notification on the operation display unit, based on the received start notification, wherein the notification includes information indicating that the image forming apparatus accepts the remote support service; and
controlling to execute a print job for test printing and not to allow executing a print job which is not for test printing when the printer controller identifies that the image forming apparatus has accepted the remote support service.

17. A non-transitory computer-readable storage medium storing a computer program for causing a computer to execute each step in a method of controlling a printer controller connected to an image forming apparatus, the method comprising:
transmitting a print job to the image forming apparatus;
displaying, on an operation display unit, a management display for managing a print job to be processed by the image forming apparatus;
receiving, from the image forming apparatus, in a case where a remote support service for performing maintenance of the image forming apparatus is started between an external apparatus and the image forming apparatus via a relay server, a start notification of the remote support service;
notifying a notification on the operation display unit, based on the received start notification, wherein the notification includes information indicating that the image forming apparatus accepts the remote support service; and
controlling to execute a print job for test printing and not to allow executing a print job which is not for test printing when the printer controller identifies that the image forming apparatus has accepted the remote support service.

* * * * *